US005671513A

United States Patent [19]
Kawahara et al.

[11] Patent Number: 5,671,513
[45] Date of Patent: Sep. 30, 1997

[54] CLIP

[75] Inventors: Seiichi Kawahara, Kure; Yoshiaki Hamamoto, Hiroshima, both of Japan

[73] Assignees: Molten Corporation, Hiroshima; Nifco Inc., Yokohama, both of Japan

[21] Appl. No.: 501,759

[22] Filed: Jul. 12, 1995

[30] Foreign Application Priority Data

Jul. 18, 1994 [JP] Japan ................................. 6-186811

[51] Int. Cl.⁶ ............................ A44B 17/00; A44B 21/00; F16B 19/00
[52] U.S. Cl. ........................ 24/573.1; 411/508; 411/913
[58] Field of Search ..................... 24/573.1, 572, 24/379.1, 297, 625; 174/138 D; 411/508, 509, 510, 182, 913; 403/405.1, 406.1, 407.1, 408.1

[56] References Cited

U.S. PATENT DOCUMENTS

| 4,506,419 | 3/1985 | Mitomi | 24/573.1 X |
|---|---|---|---|
| 4,527,821 | 7/1985 | Tanaka | 411/508 X |
| 4,579,478 | 4/1986 | Takahashi | 174/138 D X |
| 4,856,151 | 8/1989 | Fujimoto | 174/138 D X |
| 4,865,505 | 9/1989 | Okada | 411/508 X |
| 5,429,467 | 7/1995 | Gugle et al. | 411/508 X |
| 5,448,809 | 9/1995 | Kraus | 24/297 X |

FOREIGN PATENT DOCUMENTS

| 4211072 | 1/1993 | Germany | 411/508 |
|---|---|---|---|
| 4-111906 | 9/1992 | Japan . | |
| 756094 | 8/1956 | United Kingdom | 411/508 |

Primary Examiner—Peter M. Cuomo
Assistant Examiner—Robert J. Sandy
Attorney, Agent, or Firm—Oblon, Spivak, McClelland, Maier & Neustadt, P.C.

[57] ABSTRACT

A clip includes a fastener unit and a leg unit, the fastener unit having a pair of support plates projecting in parallel from the underside of a trim plate to be fastened and being formed at their distal ends with slits and a pair of engagement members provided on the outer surfaces of the support plates, and the leg unit having a pair of parallel wall plates formed on upper inner surface portions with steps for engaging with the engagement members of the fastener unit and a base connecting the wall plates and formed with a pair of opposing elastic legs at positions spaced from the wall plates and with lugs for engagement with the slits.

6 Claims, 6 Drawing Sheets

CLIP

BACKGROUND OF THE INVENTION

1. Field of the Invention

This invention relates to a clip for attaching a plate to a panel, particularly for attaching to a panel a trim plate, a protector plate, a kicking plate or other such plate with both decorative and protective functions.

2. Description of the Prior Art

A prior art clip of the aforesaid type described in Japanese Utility Model Public Disclosure Hei 4-111906 consists of a fastener unit formed to project from the underside of the plate and a separate leg unit that fits into the fastener unit. The fastener unit consists a pair of parallel support plates slit at their tips and engagement members formed on the outer surfaces of the support plates. The leg unit consists of a pair of wall plates having through holes for receiving the engagement members and a base provided with spreadable legs spaced apart from the wall plates. For engaging the clip with a panel attachment hole, the fastener unit and the leg unit are joined by engaging the slits with the base and the engagement members with the through holes. The clip of this configuration is economical since it is durable enough to be used more than once and can be repaired by replacing only the unit (fastener unit or leg unit) which has broken.

Since this prior art clip requires through holes to be formed in the pair of wall plates constituting the leg unit, however, a two-plane split mold cannot be used for forming the leg unit. Since the mold therefore has to be equipped with a slider, it is complicated in structure, high in cost and unsuitable for producing a number of units at one time.

In addition, since the wall plates are provided with the through holes for receiving the engagement members, the periphery of the through hole (the wall plate portions on opposite sides of the through hole) are narrow. The wall plates are therefore likely to break with repeated use.

This invention was accomplished for overcoming the aforesaid problems and has as its object to provide a clip whose wall plates do not break with repeated use, whose elastic legs can retain their elasticity, which can be formed using a two-plane split mold, and which can be produced many at a time.

SUMMARY OF THE INVENTION

For achieving this object, the invention provides a clip comprising a fastener unit and a leg unit, the fastener unit having a pair of support plates projecting in parallel from the underside of a trim plate to be fastened and being formed at their distal ends with slits and a pair of engagement members provided one on the outer surface of each support plate, and the leg unit having a pair of parallel wall plates formed on upper inner surface portions with steps for engaging with the engagement members of the fastener unit and a base connecting the wall plates and formed with a pair of opposing elastic legs at positions spaced from the wall plates and with a pair of lugs for engagement with the slits.

When the fastener unit of the clip is pushed into the leg unit by applying a force to the top of the trim plate, the slits engage with the lugs on the base and the engagement members spread the wall plates apart.

When the engagement members reach the recesses, the wall plates spring back and cause the engagement members to enter the recesses and engage with the steps.

Then, if the clip is inserted into an attachment hole in a panel, for example, and force is applied to the top of the trim plate, the elastic legs will flex inward, allowing the trim plate (or if optional flanges are provided on the wall plates, the flanges) to abut on the surface of the panel.

After abutment of the flanges on the panel, the elastic legs spring back owing to their own elasticity (and if an optional elastic link is connected between the wall plates, the elasticity thereof), catching the panel between the flanges and the elastic legs and attaching the clip to the panel.

In the invention of the present invention, the steps for engagement with the engagement members can be provided without forming through holes in the wall plates. Since the wall plates can therefore be formed so as to have high strength, they are resistant to breakage with repeated use.

In addition, the operability of the clip can be enhanced by forming flanges on the leg unit to prevent the leg unit from falling behind the panel when the clip is detached from the panel.

Moreover, by forming the recesses constituting the steps in the wall plates to open at the lower ends of the wall plates and communicating the space enclosed by the elastic link, the elastic legs and the base with the exterior of the base via a through hole, the leg unit can be formed using a two-plane split mold and it becomes possible to produce a number of the leg units at one time. As the mold therefore does not require a slider and can be of a simple structure, it is inexpensive to fabricate.

The above and other objects, characteristic features and advantages of this invention will become apparent to those skilled in the art from the description of the invention given hereinbelow with reference to the accompanying drawings.

DESCRIPTION OF THE PREFERRED EMBODIMENTS

The clip according to this invention comprises a fastener unit 11 formed integrally with the underside of a plate (such as a trim plate) 1 and a leg unit 21 which engages with the fastener unit 11.

Figure 1:
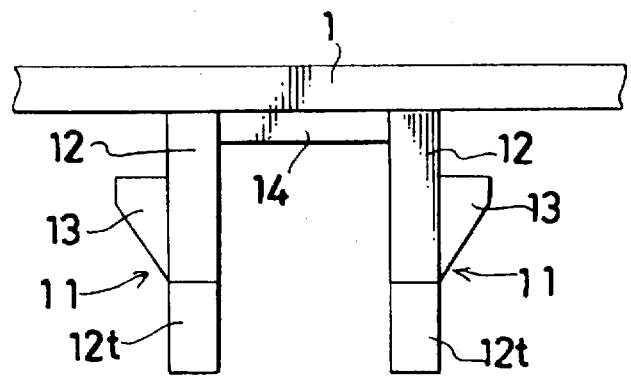
FIG. 1 is a front view of a fastener unit used by one embodiment of the clip according to the invention.
Figure 2:
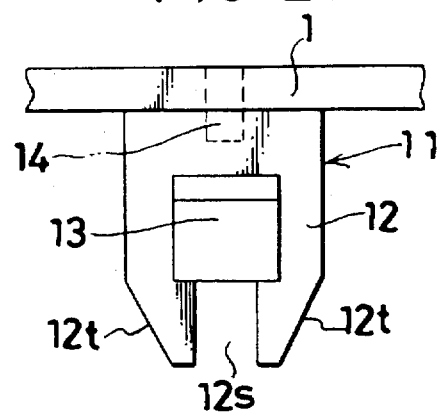
FIG. 2 is a side view of the fastener unit shown in FIG. 1.
Figure 3:
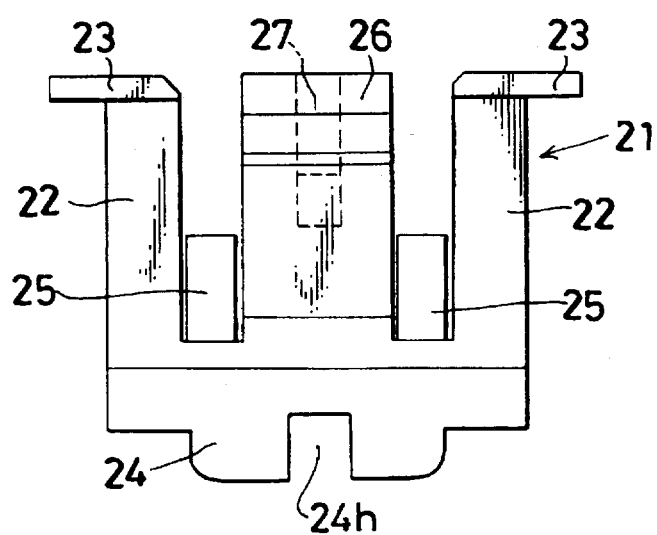
FIG. 3 is a front view of an example of a leg unit of a clip according to this invention.
Figure 4:
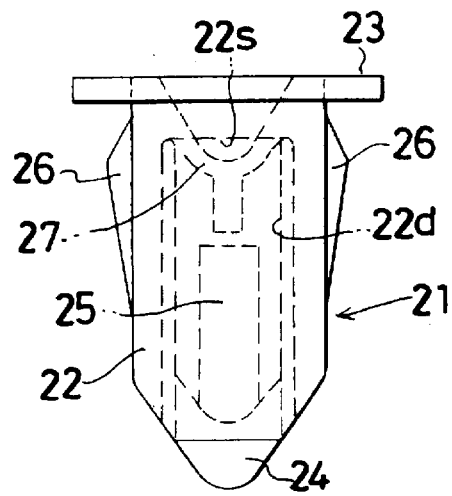
FIG. 4 is a side view of the leg unit shown in FIG. 3.
Figure 5:
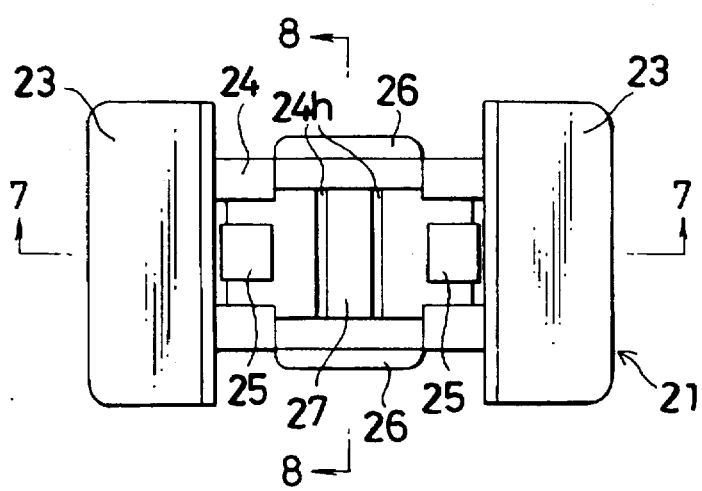
FIG. 5 is a plan view of the leg unit shown in FIG. 3.
Figure 6:
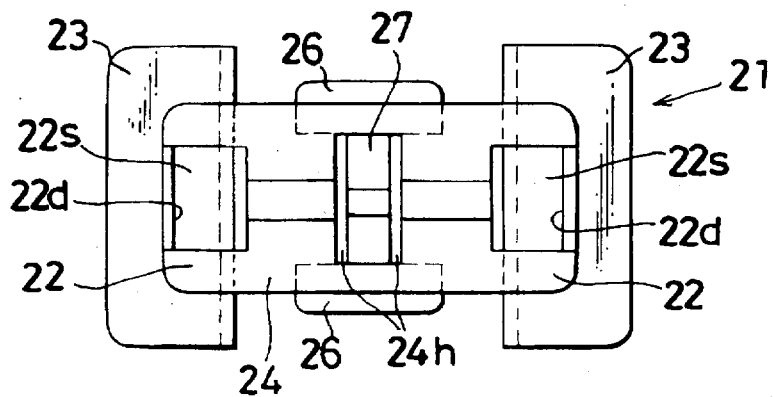
FIG. 6 is a bottom view of the leg unit shown in FIG. 3.
Figure 7:
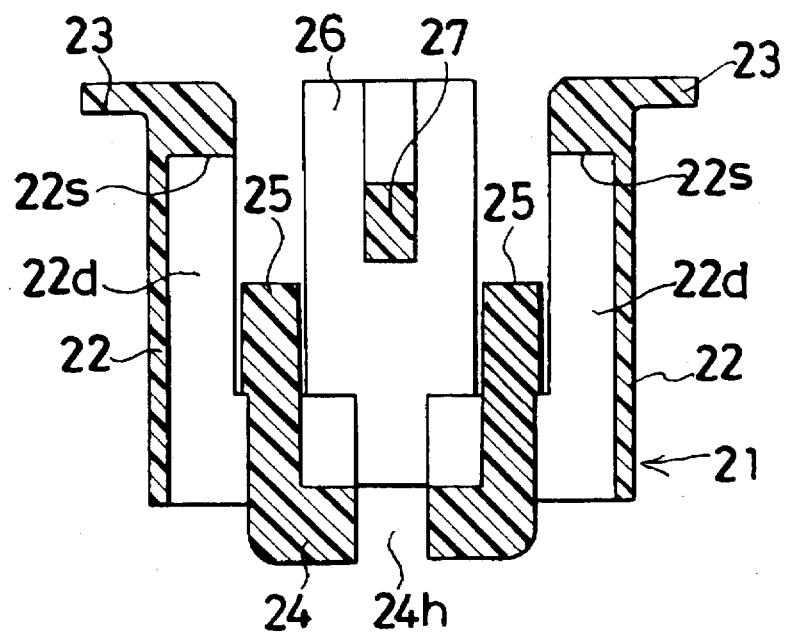
FIG 7 is a sectional view taken along line 7—7 in FIG. 5.
Figure 8:
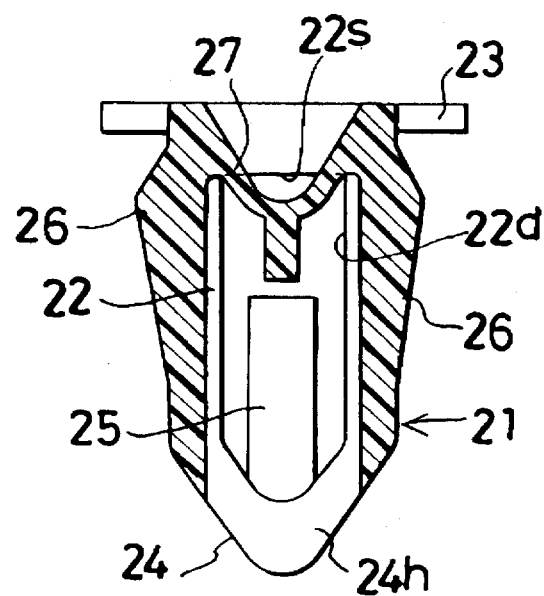
FIG. 8 is a sectional view taken along line 8—8 in FIG. 5.

FIGS. 1 and 2 show an example of the fastener unit 11 of the invention clip. In these figures, reference numeral 1 designates a synthetic resin trim plate for use in an automobile and the fastener unit 11 is formed integrally with the underside of the trim plate 1.

The fastener unit 11 is formed of a pair of support plates 12 projecting in parallel from the underside of the trim plate 1, a pair of engagement members 13 projecting from the outer surfaces of the support plates 12, and a beam member 14 connecting the support plates 12 at the underside of the trim plate 1 for reinforcement. The tip of each support plate 12 is formed with a slit 12s and is tapered downward by taper surfaces 12t.

The trim plate 1, which is ordinarily of considerable length, is provided with a plurality of regularly spaced fastener units 11.

An example of the leg unit 21 of the invention clip is illustrated in FIGS. 3 to 8. The leg unit 21, which is also formed of synthetic resin, comprises a pair of parallel wall plates 22, a pair of flanges 23 extending laterally outward from the upper ends of the wall plates 22, a base 24 connecting the lower ends of the wall plates 22, two lugs 25 formed on the base 24 for engaging with the slits 12s of the support plate 12, two opposing elastic legs 26 formed on the base 24 at positions spaced from the wall plates 22, and an elastic link 27 connecting the elastic legs 26. The upper portion of the inner surface of each wall plate 22 is formed with a step 22s for engaging with one of the engagement members 13 of the fastener unit 11.

The steps 22s are constituted as the upper ends of recesses 22d formed to extend to and open at the lower ends of the wall plates 22 while maintaining a constant sectional area.

The space enclosed by the elastic link 27, the elastic legs 26 and the base 24 communicates with a through hole 24h formed in the base 24 directly under the elastic link 27 over an area corresponding to the image of the elastic link 27 projected onto the base 24 as by a beam of parallel rays directed normal to the elastic link 27 from above.

Figure 9:
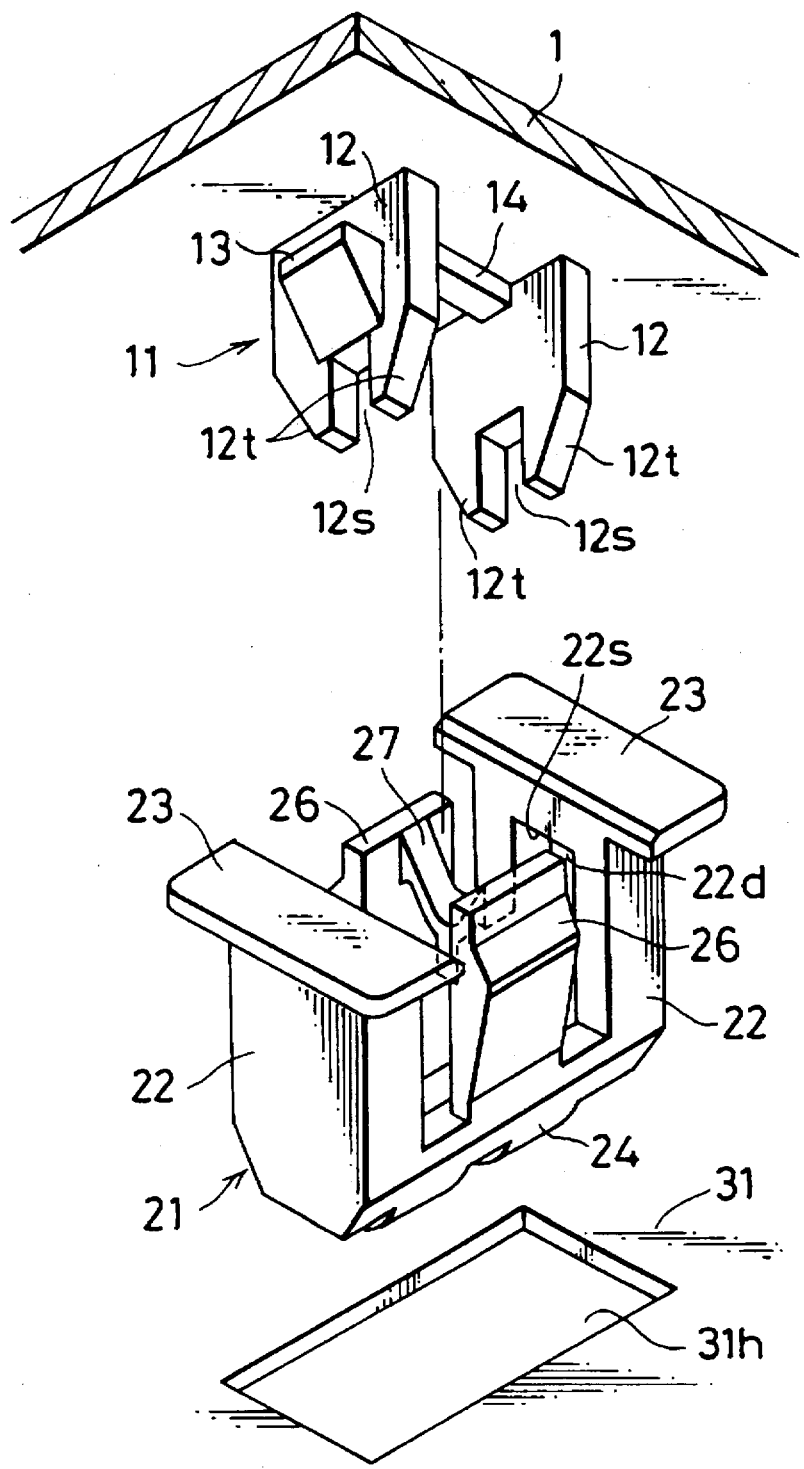
FIG. 9 is a perspective view of a clip consisting of the fastener unit of FIG. 1 and the leg unit of FIG. 3, showing the two units the separated state.
Figure 10:
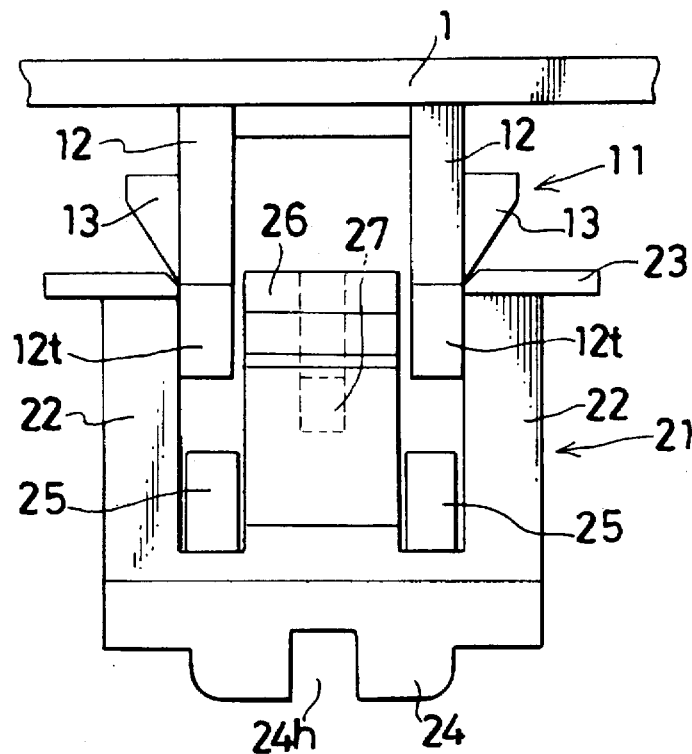
FIG. 10 is front view showing the clip of FIG. 9 in the first stage assembly.
Figure 11:
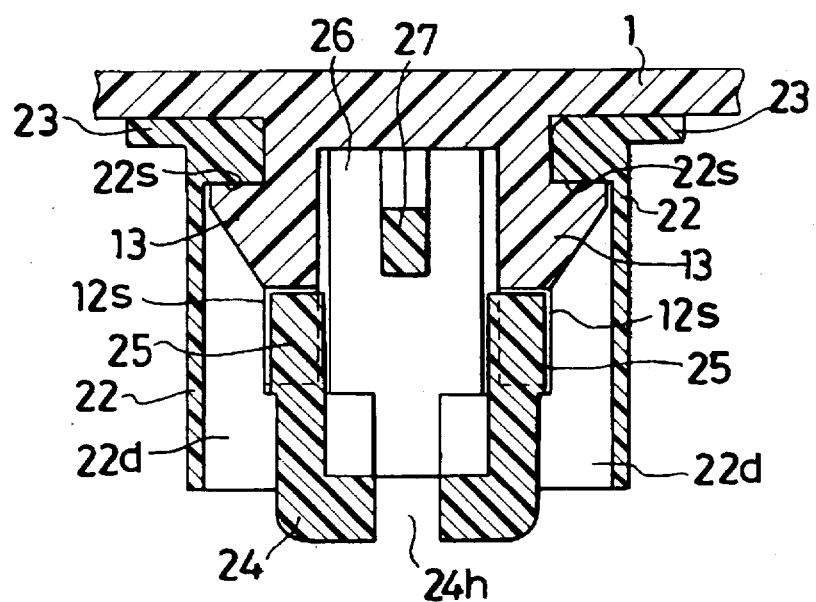
FIG. 11 is a sectional view showing the clip of FIG. 9 in the assembled state.
Figure 12:
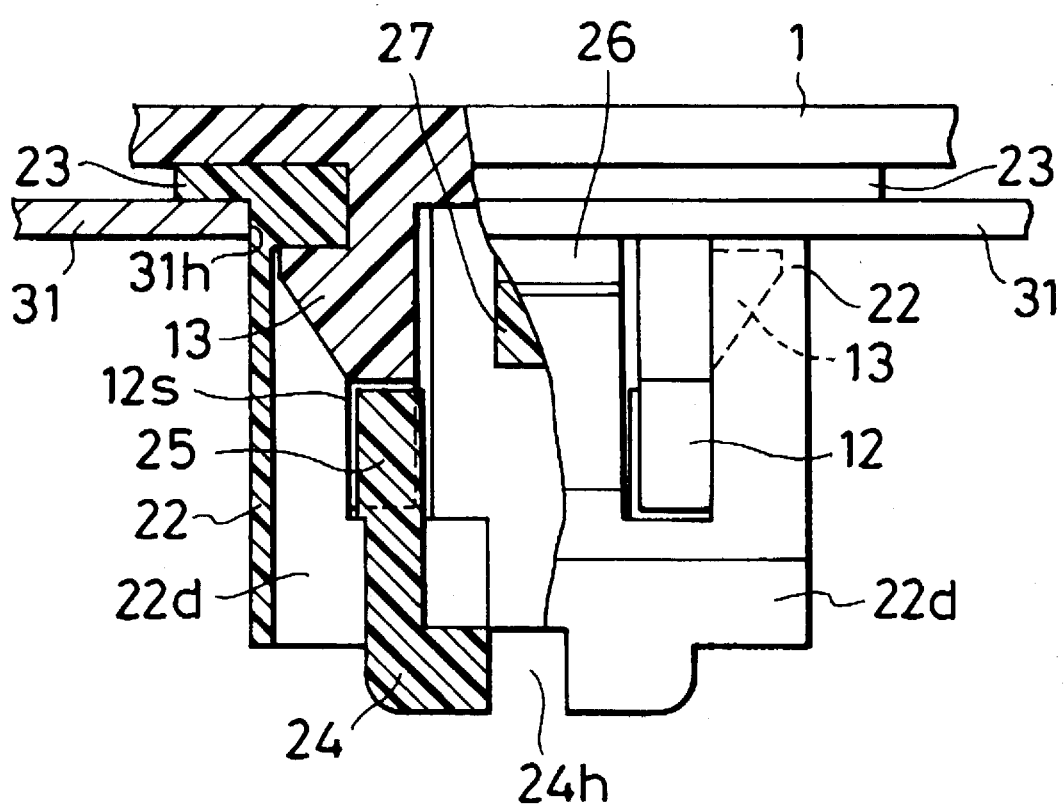
FIG. 12 is a front view, partially in section, showing the clip attached to a panel.

FIG. 9 is a perspective view of the fastener unit 11 and the leg unit 21 of the clip before they are joined, FIG. 10 is a front view showing the fastener unit 11 and the leg unit 21 in the first stage of assembly, FIG. 11 is a sectional view showing the clip in the assembled state, and FIG. 12 is a front view, partially in section, showing the clip attached to a panel 31. For attachment of a number of clips to the panel 31, the panel 31 is formed with rectangular clip attachment holes 31h at intervals corresponding to the spacing of the fastener units 11 on the trim plate 1.

The assembly of the clip will now be explained.

First, as shown in FIG. 10, force is applied to the top of the trim plate 1 for pressing the fastener unit 11 into the leg unit 21 using the taper surfaces 12t at the tips of the support plates 12 as guides. As a result, the lugs 25 fit into the slits 12s and the engagement members 13 spread the wall plates 22 by flexing them outward.

When the engagement members 13 reach the recesses 22d, the wall plates 22 spring back and cause the engagement members 13 to enter the recesses 22d as shown in FIG. 11.

Since the engagement members 13 therefore engage with the steps 22s, the fastener unit 11 and the leg unit 21 are joined such that the fastener unit 11 cannot be extracted by pulling it upward unless the wall plates 22 are spread apart.

The attachment of the clip will now be explained.

The leg unit 21 side, namely the base 24 side, of the clip assembled in the foregoing manner is inserted into an attachment hole 31h of the panel 31 and a force is applied to the top of the trim plate 1. Since the elastic legs 26, which are spread slightly wider than the width of the attachment hole 31h, therefore flex inward while bending the elastic link 27, the flanges 23 strike on the surface of the panel 31.

After abutment of the flanges 23 on the panel 31, the elastic legs 26 spring back owing to their own elasticity and the elasticity of the elastic link 27, catching the panel 31 between the flanges 23 and the elastic legs 26 and attaching the clip to the panel 31.

As will be understood from the foregoing, in the invention clip the steps 22s for engagement with the engagement members 13 can be provided without forming through holes in the wall plates 22. Since the wall plates 22 can therefore for be formed so as to have high strength, they are resistant to breakage with repeated use.

In addition, the operability of the clip is enhanced since the flanges 23 formed on the leg unit 21 prevent the leg unit 21 from falling behind the panel 31 when the clip is detached from the panel 31.

Since the force acting to spread the elastic legs 26 is increased by connecting the elastic legs 26 through the elastic link 27, moreover, the elasticity of the elastic legs 26 can be maintained despite repeated use.

Since the recesses 22d are formed to open at the lower ends of the wall plates 22 and the space enclosed by the elastic link 27 and the base 24 communicates with the exterior of the base 24 via the through hole 24h, the leg unit 21 can be formed using a two-plane split mold and it becomes possible to produce a number of the leg units 21 at one time.

As the mold does not require a slider and can be of a simple structure, it is inexpensive to fabricate.

While in the embodiment described in the foregoing the recesses 22d forming the steps 22s open at the lower ends of the wall plates 22, it is instead possible to form the steps 22s by recessing only the regions concerned.

While this structure does not allow the leg unit 21 to be formed by separating the mold halves vertically, it does enable the steps 22s for engagement with the engagement members 13 to be formed without forming through holes in the wall plate 22 and, as such, provides the wall plates 22 with the strength required for withstanding repeated use without breakage.

The flanges 23 provided in the foregoing embodiment can be omitted.

If they are not provided, the clip is attached to the panel 31 by clamping the panel 31 between the trim plate 1 and the elastic leg 26.

The through hole 24h and the elastic link 27 can also be omitted.

While the foregoing embodiment was explained with respect to the case where the plate attached by the clip is trim plate, the clip can of course also be used for attaching a protector plate, kicking plate or other such plate with both decorative and protective functions.

In the invention clip, since the steps for engaging the engagement members can be formed without forming through holes in the wall plates, the wall plates can therefore be formed to have the high strength necessary for them to resist breakage with repeated use.

In addition, the operability of the clip is enhanced since the flanges formed on the leg unit prevent the leg unit from falling behind the panel when the clip is detached from the panel.

Moreover, since the recesses forming the steps in the wall plates open at the lower ends of the wall plates, the leg unit can be formed using a two-plane split mold and it becomes possible to produce a number of the leg units at one time. As the mold therefore does not require a slider and can be of a simple structure, it is inexpensive to fabricate.

Further, since the force acting to spread the elastic legs is increased by connecting the elastic legs through an elastic link, the elasticity of the elastic legs can be maintained despite repeated use.

In addition, since the space enclosed by the elastic link and the base communicates with the exterior of the base via a through hole, the leg unit can be formed using a two-plane split mold and it becomes possible to produce a number of the leg units at one time. As the mold therefore does not require a slider and can be of a simple structure, it is inexpensive to fabricate.

Obviously, numerous modifications and variations of the present invention are possible in light of the above teachings. It is therefore to be understood that within the scope of the appended claims, the invention may be practiced otherwise than as specifically described herein.

What is claimed is:

1. A clip, comprising:
a fastener unit and a leg unit, said fastener unit having a pair of support plates projecting in parallel from an underside of a trim plate to be fastened and being formed at their distal ends with slits and a pair of engagement members provided one on an upper outer surface portion of each support plate,
said leg unit having a pair of parallel wall plates formed on upper inner surface portions with steps engaging with said engagement members and a base connecting said pair of wall plates and formed with a pair of opposing elastic legs at positions spaced from said wall plates and with a pair of lugs for engagement with said slits, each step of each wall plate comprising an upper end of a recess formed to extend to and open at a lower end of said wall plate while maintaining a constant sectional area; and
an elastic link connecting said elastic legs.

2. A clip according to claim 1, wherein a through hole is formed in said base directly under the elastic link over an area corresponding to an image of said elastic link projected onto the base, and a space enclosed by said elastic link, and wherein said elastic legs and said base communicate with said through hole.

3. A clip, comprising:
a fastener unit and a leg unit, said fastener unit having a pair of support plates projecting in parallel from an underside of a trim plate to be fastened and being formed at their distal ends with slits and a pair of engagement members provided one on an upper outer surface portion of each support plate, and
said leg unit having a pair of parallel wall plates formed on upper inner surface portions with steps engaging with said engagement members, a base connecting said pair of wall plates and formed with a pair of opposing elastic legs at positions spaced from said wall plates and with a pair of lugs for engagement with said slits, and an elastic link connecting said elastic legs.

4. A clip according to claim 3, wherein a through hole is formed in said base directly under the elastic link over an area corresponding to an image of said elastic link projected onto the base, and a space enclosed by said elastic link, said elastic legs and said base communicates with said through hole.

5. A clip, comprising:
a fastener unit and a leg unit, said fastener unit having a pair of support plates projecting in parallel from an underside of a trim plate to be fastened and being formed at their distal ends with slits and a pair of engagement members provided one on an upper outer surface portion of each support plate, and
said leg unit having a pair of parallel wall plates formed on upper inner surface portions with steps engaging with said engagement members, a base connecting said pair of wall plates and formed with a pair of opposing elastic legs at positions spaced from said wall plates and with a pair of lugs for engagement with said slits, and an elastic link connecting said elastic legs, each step of each wall plate being constituted as an upper end of a recess formed to extend to and open at a lower end of said wall plate while maintaining a constant sectional area.

6. A clip according to claim 5, wherein a through hole is formed in said base directly under the elastic link over an area corresponding to an image of said elastic link projected onto the base, and a space enclosed by said elastic link, said elastic legs and said base communicates with said through hole.

* * * * *